UNITED STATES PATENT OFFICE 2,606,891

PREPARATION OF STYRENE-MALEIC COPOLYMERS

Stanley P. Rowland, Philadelphia, Pa., assignor to Rohm & Haas Company, Philadelphia, Pa., a corporation of Delaware No Drawing. Application June 1, 1949, Serial No. 96,617

4 Claims. (Cl. 260—78.5)

This invention relates to a process of preparing conjoint polymers of styrene and maleic anhydride. More particularly, it relates to the production of such polymers which have relatively low molecular weights and which are especially suitable for the preparation of surface coatings.

Copolymers or interpolymers of styrene and maleic have been prepared heretofore and it is generally believed that the polymers are made up of a series of units having the following general structure:

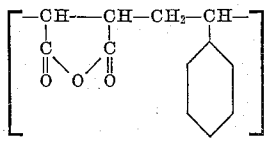

These polymers have been further modified by neutralization with bases and by esterification with alcohols to produce resins suitable for molding. Such resins have also been suggested for use in surface-coatings, but their use in that application has not been successful primarily because the resins heretofore have been too high in molecular weight and consequently too high in viscosity. These polymers have many desirable chemical properties but their physical properties are such that it is not feasible, or convenient, or economical to use them.

An object of this invention, therefore, is to regulate the polymerization of styrene and maleic anhydride so that polymers are produced which contain, on the average, only about 5 to 12 of the above units and which, as a result, have average molecular weights from about 1000 to about 2400. Molecular weights can be determined, for example, by the ebullioscopic method with acetone as the solvent. The preparation of these low polymers cannot be accomplished by simply shortening the period of polymerization because the amount of polymer—not the kind of polymer—is dependent on the length of time of polymerization. The kind of polymer is for the most part determined by the conditions, such as temperature and the presence of modifiers, which prevail at the beginning of, and throughout, the period of polymerization. I have found that the presence of mercaptans, during the polymerization of styrene and maleic anhydride, has a marked effect on the kind of polymer which is produced without significantly affecting the rate of polymerization. This invention, therefore, constitutes an improvement in the process of copolymerizing styrene and maleic anhydride whereby the kind or size of the polymer can be regulated. By this process, polymers of low molecular weight and low viscosity are obtained, which polymers are eminently suitable for many new uses especially in the preparation of surface-coatings.

According to the process of this invention, styrene and maleic anhydride are dissolved in an inert organic solvent and are polymerized by means of a peroxidic catalyst, preferably under the influence of heat, in the presence of a soluble mercaptan.

The mercaptans which are employed are those containing 5 to 22 carbon atoms. This is not to say that mercaptans containing fewer or more carbon atoms cannot be used under some conditions. Methyl, ethyl, propyl and butyl mercaptans can be used but not practically because of their odor and/or the fact that they are gaseous or too low boiling and require the use of pressure. Mercaptans having more than 22 carbon atoms likewise influence the polymerization reaction but these are much less effective and ordinarily are less soluble. The effect of the mercaptan is proportional to the amount of sulfur which it contains, and, therefore, the most efficient mercaptans are those of lowest molecular weight. Much larger weights of the higher mercaptans are required in order to obtain the same results and, since it is intended that this process be commercially practicable, it is much preferred that the mercaptans containing 5 to 12 carbon atoms be employed. The following are examples of mercaptans which can be used in this invention: tert-amyl mercaptan, n-hexyl mercaptan, iso-octyl mercaptan, the lauryl mercaptans, octadecyl mercaptans, docosyl mercaptans, and the isomers and mixtures of the foregoing. The effect of as little as 1% mercaptan, based on the weight of the styrene and maleic anhydride, is evident and as much as 40% mercaptan has been employed. Amounts, however, from 5% to 25% are much preferred and recommended. The molecular weight of the polymer which is obtained is usually inversely proportional to the amount of sulfur present in the form of mercaptan.

The styrene and maleic anhydride are polymerized in solution. The solvents which are the most satisfactory in this process are the ketones and esters typified by acetone, dioxane, methyl isobutyl ketone, methyl ethyl ketone, mesityl oxide, ethyl acetate, butyl acetate and the like. Any organic liquid can be used which is inert under the conditions employed, and which is miscible with the reactants and a solvent for the polymeric products. The word inert is used in its accepted sense to indicate that the solvent does not react chemically with either the reactants or products. The reactants polymerize quite satisfactorily at a concentration of 25 to 50% in the solvent, although it should be apparent that the success of this process is not dependent on any particular range of concentration and that the concentration will be dictated by the particular requirements.

The copolymerization in the presence of mercaptans takes place over a wide range of temperature. Ordinarily, a temperature from 50° C. to 150° C. is suitable while one within the range of 90° C. to 125° C. is preferred. A most convenient way of carrying out the polymerization is to heat the solution of reactants to the refluxing temperature and to maintain this temperature until polymerization is complete.

The art is already familiar with the peroxidic catalysts which are used. These are the materials which are recognized as catalysts for the polymerization of compounds containing a vinylidene group, $CH_2=C<$, and are typified by the following: benzoyl peroxide, acetone peroxide, lauroyl peroxide, succinyl peroxide, tert-butyl hydroperoxide, di-tert-butyl peroxide, tert-butyl perbenzoate, di-tert-butyl diperphthalate and the like. From 0.25% to 5% of the peroxidic catalyst, based on the polymerizable materials, or even more can be used but ordinarily from about 0.25% to about 2% is adequate.

The following examples illustrate how conjoint polymers of styrene and maleic anhydride can be prepared and how the molecular weight and viscosity of the copolymers are affected by mercaptans.

*Example 1*

A mixture of 256.5 grams of maleic anhydride, 5.25 grams of benzoyl peroxide and 1575 grams of dioxane was placed in a reactor equipped with a mechanical stirrer, reflux condenser, thermometer and dropping funnel. The mixture was stirred and heated to refluxing temperature at which point the addition of styrene was begun. In all, 273 grams of styrene was added slowly over a period of 15–30 minutes while the temperature was held above 95° C. The mixture was stirred and refluxed for 5 hours, and then cooled. The viscosity of the resultant solution (25% copolymer) was $Z_2$ on the Gardner-Holdt viscosity scale (36 poises) at 25° C. and the color was 3 on the Gardner-Holdt color scale.

*Example 2*

Under the same conditions, a mixture of 147 grams of maleic anhydride, 3.0 grams of benzoyl peroxide, 300 grams of dioxane and 156 grams of styrene was heated for 5 hours at refluxing temperature. The product was a 50% solution of the copolymer of styrene and maleic anhydride which had a viscosity at 25° C. of 1070 poises and a color of 9 (Gardner-Holdt scale).

When the same reactants were copolymerized in the identical manner in methyl isobutyl ketone (instead of dioxane), the product was a dark red, insoluble, gummy polymer.

*Example 3*

This example parallels Example 2. To a stirred solution of 147 grams of maleic anhydride, 3.0 grams of benzoyl peroxide, and 16 grams of amyl mercaptan in 300 grams of dioxane was slowly added 156 grams of styrene at refluxing temperature. Polymerization was continued for 5 hours at refluxing temperature after which the solution was cooled to room temperature. The resultant 50% solution of copolymer had a viscosity of 590 poises (28 on Gardner-Holdt scale) and a color of 1 (Gardner-Holdt scale). When this solution was diluted to a concentration of 25% with more dioxane, the resultant solution had a viscosity of 0.5 poise (A on the Gardner-Holdt scale).

When the same amounts of materials were reacted under the same conditions in methyl isobutyl ketone as a solvent instead of in dioxane, the resultant solution of copolymer had a viscosity at 25° C. of 98 poises ($Z_5$ on Gardner-Holdt scale) and a color of 1 (Gardner-Holdt scale).

In addition to having lower viscosity and better solubility, the copolymers of this invention have much paler color than unmodified copolymers prepared heretofore. This is advantageous when the polymers are to be used in the preparation of white and light colored enamels, for example. Whereas the solutions of unmodified copolymers ordinarily are brownish and have a color of 10 to 15 on the standard Gardner-Holdt color scale, the mercaptan-modified copolymers of this invention are water-white to straw-colored and measure 1 to 3 on the color scale. The products of this invention can be readily converted into other products, such as salts and esters. In fact, one of the real advantages of the copolymers of low molecular weight produced herein is that they can be completely esterified and that the advantages in color, low viscosity and greater solubility in cheap solvents carry over into the esterified product. Thus, whereas only about half of the acidic groups in the styrene-maleic anhydride copolymers known heretofore could be esterified, at least 85% of the acidic groups in the copolymers of this invention can be esterified, thereby giving rise to materials having much enhanced water- and alkali-resistance.

I claim:

1. A process for preparing copolymers of styrene and maleic anhydride having molecular weights from 1000 to 2400 which consists of copolymerizing styrene and maleic anhydride in solution in an inert organic solvent at a temperature of 90° C. to 125° C. with an organic peroxidic catalyst in the presence of a dissolved mercaptan containing 5 to 12 carbon atoms and being present in an amount equal to 5% to 25% of the weight of the styrene and maleic anhydride.

2. A process for preparing copolymers of styrene and maleic anhydride having molecular weights from 1000 to 2400 which consists of copolymerizing styrene and maleic anhydride in solution in an inert organic solvent at a temperature of 50° C. to 150° C. with an organic peroxidic catalyst in the presence of dissolved amyl mercaptan in an amount equal to 5% to 25% of the weight of the styrene and maleic anhydride.

3. A process for preparing copolymers of styrene and maleic anhydride having molecular weights from 1000 to 2400 which consists of copolymerizing styrene and maleic anhydride in solution in an inert organic solvent at a temperature of 50° C. to 150° C. with an organic peroxidic catalyst in the presence of dissolved lauryl mercaptan in an amount equal to 5% to 25% of the weight of the styrene and maleic anhydride.

4. A process for preparing copolymers of styrene and maleic anhydride having molecular weights from 1000 to 2400 which consists of copolymerizing styrene and maleic anhydride in solution in an inert organic solvent at a temperature of 50° C. to 150° C. with an organic peroxidic catalyst in the presence of dissolved octyl mercaptan in an amount equal to 5% to 25% of the weight of the styrene and maleic anhydride.

STANLEY P. ROWLAND.

REFERENCES CITED

The following references are of record in the file of this patent:

UNITED STATES PATENTS

| Number | Name | Date |
|---|---|---|
| 2,047,398 | Voss et al. | July 14, 1936 |
| 2,286,062 | Condo et al. | June 9, 1942 |
| 2,396,997 | Fryling | Mar. 19, 1946 |
| 2,537,015 | Barrett | Jan. 9, 1951 |

OTHER REFERENCES

Price et al., J. A. C. S., 67 pages, 1674–80, October 1945.

Gregg et al., J. A. C. S., 70 pages, 3740–43, November 1948.